(Model.)

W. H. BOYD.
NETTING.

No. 287,616.   Patented Oct. 30, 1883.

WITNESSES:
Theo. G. Hoster
C. Sedgwick

INVENTOR:
W. H. Boyd
BY Munn & Co
ATTORNEYS.

UNITED STATES PATENT OFFICE.

WILLIAM H. BOYD, OF LOUISIANA, MISSOURI.

NETTING.

SPECIFICATION forming part of Letters Patent No. 287,616, dated October 30, 1883.

Application filed August 29, 1883. (Model.)

*To all whom it may concern:*

Be it known that I, WILLIAM H. BOYD, of Louisiana, in the county of Pike and State of Missouri, have invented a new and useful Improvement in Netting, of which the following is a full, clear, and exact description.

This invention consists in a fish-net or other netting made of metal, substantially as hereinafter described and claimed, the same to be used in the place of nets or netting made of thread, cord, or twine, and whereby not only a largely-increased durability and great strength are obtained, but time, labor, and material in the matter of repairs and in preserving the net or netting from decay are economized.

Reference is to be had to the accompanying drawings, forming part of this specification, in which similar letters of reference indicate corresponding parts in both the figures.

Figure 1:
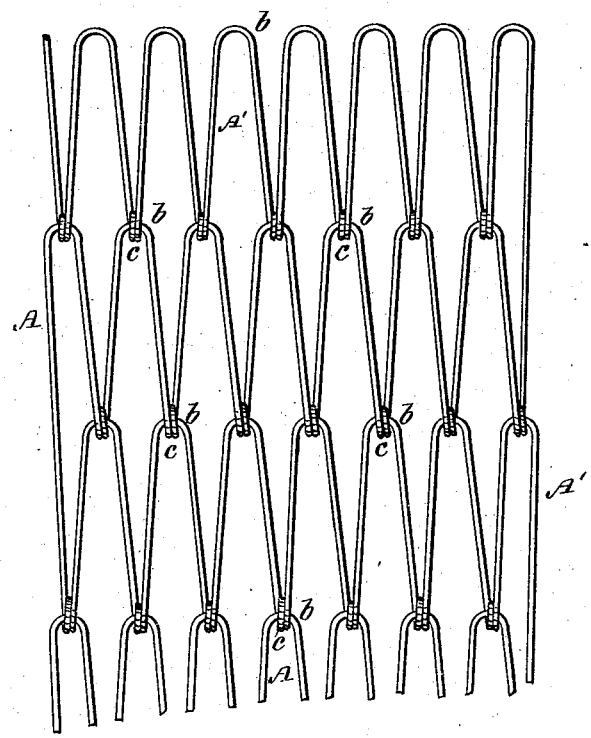
Figure 2:
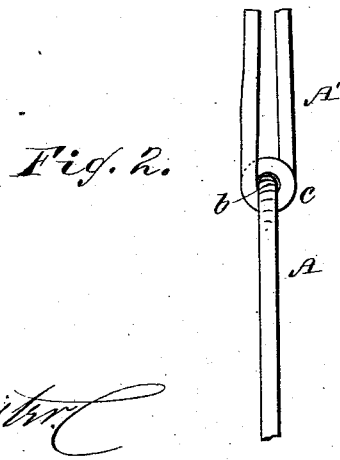

Figure 1 represents a face view of a piece of my improved netting, and Fig. 2 an edge view of a portion of the same.

The piece of netting represented in the accompanying drawings, instead of being made of twine wrought or woven in meshes, is constructed of copper or other wire capable of bearing exposure to the damp or weather, and which is moderately flexible, the same being formed of any number of rows or lengths of wire, A A', bent in a zigzag manner to produce loops, each loop having one rounded closed end, $b$, and being twisted at its opposite end, $c$, round the closed end $b$ of a loop in a succeeding row, thereby forming eyes for the loops, where connected with each other, throughout the length of the wires, to give the requisite flexibility to the net and to preserve the integrity of its meshes as formed by the arrangement of its loops.

This wire net or netting will be found very much more durable than a similar article made of twine, and when made of copper or other wire which is free, or largely so, from injury by exposure to damp or the weather, will save the time, labor, and material consumed in applying tar or other preservatives to its surface and in drying the same, as necessary with nets or netting made of cord or twine.

Having thus fully described my invention, I claim as new and desire to secure by Letters Patent—

A wire net or netting formed of any number of rows or lengths of wire, A A', bent in a zigzag manner to produce loops, each loop having one rounded closed end, $b$, and being twisted at its opposite end, $c$, round the closed end $b$ of a loop in a succeeding row, essentially as shown and described, and for the purposes herein set forth.

WILLIAM H. BOYD.

Witnesses:
GEO. W. BUCKNER,
I. N. BRYSON.